Feb. 4, 1930.                C. J. STEINER                1,745,959
FLUID PRESSURE LIFTING JACK
Filed Aug. 12, 1927
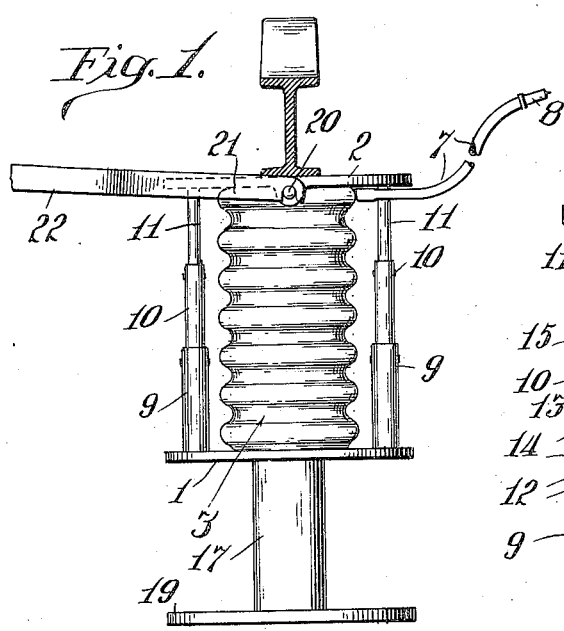
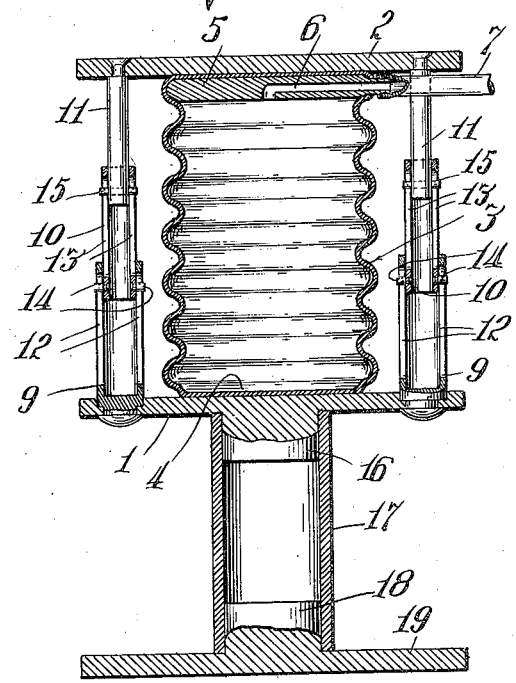
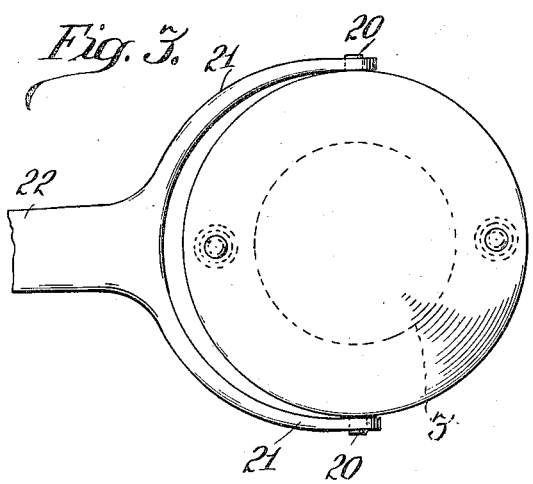
Inventor
Charles J. Steiner
By Rudolph W. Lotz
Attorney Patented Feb. 4, 1930

1,745,959

UNITED STATES PATENT OFFICE

CHARLES J. STEINER, OF CHICAGO, ILLINOIS, ASSIGNOR OF ONE-THIRD TO JOHN STEINER AND ONE-THIRD TO MICHAEL LANNERS, BOTH OF CHICAGO, ILLINOIS

FLUID-PRESSURE LIFTING JACK

Application filed August 12, 1927. Serial No. 212,385.

This invention has for its object to provide a fluid pressure lifting jack which is very light and, in collapsed or normal relative position of its component parts will occupy very small space to thus render it convenient for inclusion in the tool chest of the average automobile and readily portable for use by women, girls, boys and men.

The preferred embodiment of the invention is illustrated in the accompanying drawings wherein:

Figure 1 is a view in side elevation of a lifting jack constructed in accordance with the invention.

Figure 2 is a central vertical section of the same.

Figure 3 is a plan view of the same.

Lifting jacks for automobiles are required to have a working stroke equal to the diameter of the tire of a wheel plus about one inch. In most instances the jack to be used for lifting the axle of a vehicle, is required to be of relatively great length in order that when the base thereof rests on the ground, the axle engaging shoe thereof may reach approximately to the axle and, in the case of fluid pressure jacks, this height requires the whole structure to be so large and heavy as to be not easily disposed in the tool chest and difficult to handle, especially by women and girls.

The jack of my invention consists, therefore, of two separate and distinct portions, one thereof constituting the fluid pressure responsive element and the other a supporting base therefor, the latter being, in turn, of the knock-down type constructed to be easily assembled and disassembled and capable of being packed in a small space. The fluid pressure responsive member, being collapsible to a length considerably less than the diameter of the smallest tire used, and having a working stroke sufficient for use on vehicles equipped with the largest diameter tires, affords in itself and in conjunction with the supporting base, a very convenient and compact part of the necessary equipment of an automotive vehicle.

The said jack comprises a base plate 1 and top plate 2, both of suitable metal. Disposed between and suitably secured to the said plates 1 and 2 is a bag 3 of such material as rubberized cotton duck of the type used for the cores of pneumatic tires, the said bag having a peripheral or circumferential wall of substantially the bellows type suitably formed to normally maintain itself in collapsed condition. The top wall 5 of said bag is relatively thick and composed of a relatively hard but not brittle rubber or the like which may, if desired, be reinforced with layers of cotton duck, the details of construction of said top wall and of the bottom wall, indicated by reference character 4, constituting, per se, no part of the invention. Preferably, the top wall 5 is provided with an air duct 6 for connecting the interior of the bag 3 with the flexible hose 7, the latter being equipped at its outer end with a tire-valve 8 or the like so that it may be coupled with an ordinary air chuck for admitting compressed air to the back and may be manually operated to permit deflation of the bag. The inner diameter or mean inner diameter of the bag 3 and its end walls, must be such that air under pressure of substantially twenty pounds per square inch, will serve to expand the same and lift one end portion of the front or rear axle of a heavy passenger automobile.

Obviously the expanded bag 3 will tend to buckle or tip unless perfectly adjusted with respect to both supporting base and axle or other load and to prevent such tipping or buckling I provide between the plates 1 and 2 telescopically expansible and contractible means. In Figures 1 to 3, inclusive, I have illustrated the structure as equipped with a plurality of such telescoping members, each plurality of which, consists of a plurality of relatively short tubular members 9, 10 and 11, of respectively different diameters, the bottom member 9 being of greatest diameter and rigid with the bottom plate on which it is supported, and the member 11 of smallest diameter and rigid with the plate from which it depends. The members 9 and 10 are provided with longitudinal slots 12 and 13 and the members 10 and 11 with pins 14 and 15, fitting said slots to prevent disengagement of the several members from each other and limit the total length of the component structure when expanded. Obviously, the total number of components of the telescopic members may be increased and decreased as desired without departing from the invention as may also the total number and relative location of said members with respect to the bag 3.

The said telescopic members serve to prevent appreciable relative lateral movement between the top and bottom walls of the bag 3 and consequent slipping off of the load due to buckling of the bag 3.

The bottom plate 1 of the jack proper above described is provided centrally of its lower face with a projection 16 adapted to fit into the upper end of a tube 17, the lower end of the latter also receiving the central projection 18 on the top face of the base plate 19, the tube 17 being, in such instances as may be necessary, cut to whatever length may be required to adapt the whole structure for use on any given vehicle.

The source of fluid under pressure may consist of a manually operable air-pump, a power pump operated by the vehicle engine, or of a storage tank mounted on the vehicle as described in my copending application, filed September 17, 1926, Serial Number 137,842.

For purposes of further steadying the structure during inflation of the bag 3, I provide the top plate 2 at diametrically opposite points with projections 20 adapted to be engaged in hooks at the ends of the arms 21 of a fork end lever 22 which may be engaged by the operator to relieve any binding which may occur in the telescopic members due, for example, to lack of lubrication thereof.

While I have illustrated and described the end plates of the bag 3 as made of metal or other inflexible material, I wish it to be understood that a somewhat flexible material, such as rubber of about the type or kind used for the manufacture of rubber heels of shoes, may be substituted. In the claim, therefore, the term "inflexible" is to be construed to include any material which may be adapted to the purpose.

Thus, for example, the end plates may be constructed similarly to the treads of pneumatic tires, of thick, rubber pads reinforced with cotton-duck. This construction is so well known that illustration is not deemed necessary.

I claim as my invention:

A lifting jack comprising a base, a normally collapsed expansible bellows member mounted at one end on said base, a plate mounted upon the other end of said bellows member, said base and plate being of larger diameter than said member, a plurality of telescopically extensible elements interposed between said plates externally of said bellows member and adapted to maintain said plates parallel with each other as said bellows member expands and collapses, an air duct in one of said plates adapted to be connected with a source of compressed air for causing expansion of said bellows-member, and a hand lever connected with said upper plate to steady the same during lifting movement thereof.

CHARLES J. STEINER.